United States Patent [19]

Grünner

[11] 4,278,416

[45] Jul. 14, 1981

[54] APPARATUS FOR MOLDING TIRES OF MOTOR VEHICLES

[76] Inventor: Erich Grünner, Voltagasse 43/23/1, 1210 Wien, Austria

[21] Appl. No.: 925,464

[22] Filed: Jul. 17, 1978

[30] Foreign Application Priority Data

Jul. 15, 1977 [AT] Austria .................................. 5151/77

[51] Int. Cl.³ ............................ B29F 1/00; B29H 5/02
[52] U.S. Cl. ....................................... 425/577; 425/47; 425/54
[58] Field of Search ........................ 425/36, 40, 46, 47, 425/577

[56] References Cited

U.S. PATENT DOCUMENTS

| | | | |
|---|---|---|---|
| 1,101,732 | 6/1914 | Doughty | 425/40 |
| 3,553,789 | 1/1971 | Allitt | 425/36 |
| 3,704,082 | 11/1972 | Hottle | 425/46 X |
| 3,730,658 | 1/1973 | Marra | 425/47 |
| 3,989,791 | 11/1976 | Tippin | 425/47 X |
| 4,043,725 | 8/1977 | Schmidt | 425/47 X |
| 4,124,345 | 11/1978 | Grunner et al. | 425/577 X |

FOREIGN PATENT DOCUMENTS

2306069 12/1976 France ........................................ 425/46
519339 7/1976 U.S.S.R. .................................... 425/46

*Primary Examiner*—J. Howard Flint, Jr.
*Attorney, Agent, or Firm*—Michael J. Striker

[57] ABSTRACT

An apparatus for molding tires of vehicles, especially motor vehicles, comprises support means on which a multi-part form is mounted defining a cavity for molding a tire, wherein the inner surface of the cavity is defined by a split core and the outer surface is in part defined by an upper and lower mold part arranged at opposite ends of and coaxially with the core to define with the latter bead and side wall regions of the tire, with at least one of the mold parts axially movable with respect to the core, a plurality of mold segments respectively carried by segment carriers in which the segments have inner surfaces formed to define the tread surface region of the tire, and means for moving the segment carriers and therewith the segments carried thereon toward, respectively away from the core.

7 Claims, 5 Drawing Figures

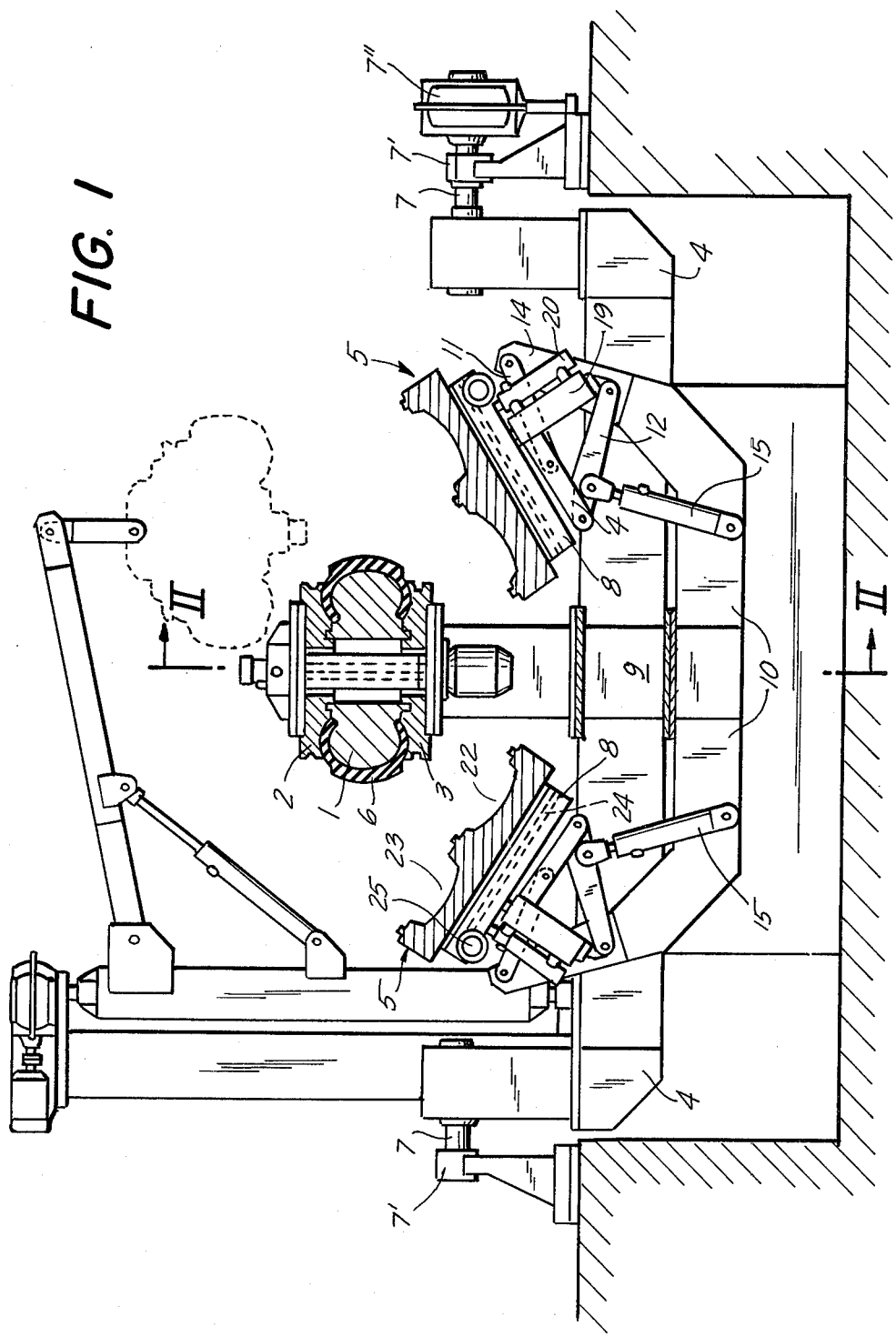

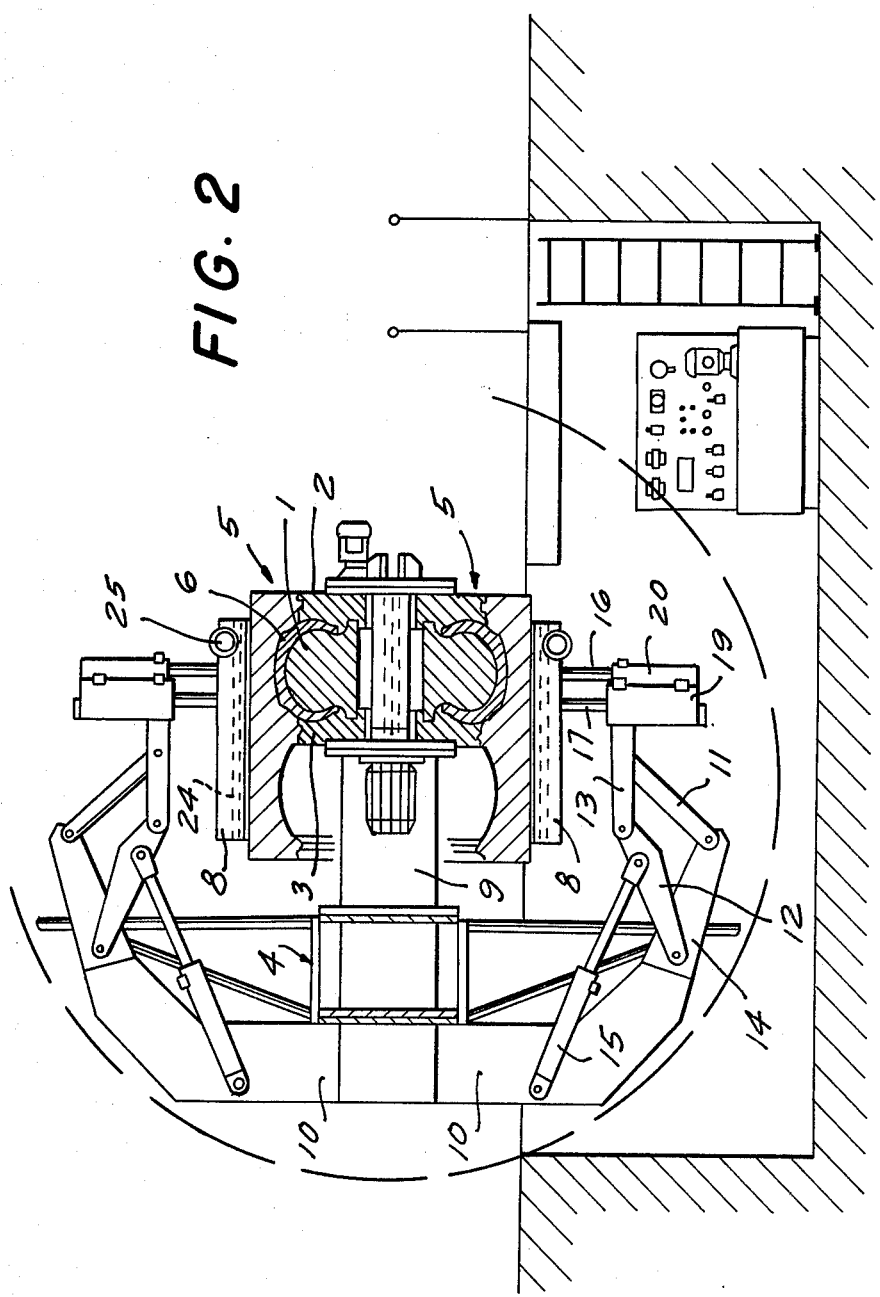

APPARATUS FOR MOLDING TIRES OF MOTOR VEHICLES

BACKGROUND OF THE INVENTION

The present invention relates to an apparatus for molding of tires for vehicles, especially motor vehicles. The apparatus comprises a multi-part mold defining a cavity for molding the tire. The inner surface of the cavity is determined by a split core and the outer surface by an upper and a lower mold part which are arranged coaxially with the core and which abut against opposite ends of the latter, with at least one of the aforementioned parts axially movable with respect to the others and forming in the assembled position the bead and side wall region of the tire, as well as a plurality of segments shaped to form the tread surface of the tire, whereby the segments are connected to segment carriers which are movable toward and away from the core.

In apparatus of the aforementioned kind known in the art different regions of the tire, especially the bead and side wall region as well as the tread region have been molded at separate stations. In this construction devices for transport from one to the other station are required so that these known apparatus are rather complicated and the expenditure for such apparatus is considerably high.

A decisive improvement of such apparatus has been made with a so far not published construction in which the whole tire is molded in a single station. In this construction, the parts of the mold for forming the tread region of the tire to be molded are composed of tiltable segments. These segments are mounted on segment carriers which are tangentially tiltable away with respect to the essential circular form about axes arranged below the latter. This apparatus has, however, the disadvantage that it can hardly be used for molding tires of large dimensions since the individual segments, after the molding operation, may not be tilted away from the produced tire without damaging, respectively deforming the same.

According to a further not yet prepublished suggestion, an improvement of the above-mentioned apparatus has been obtained in which the tire is likewise molded in a single station. In this construction the bead and side wall regions of the tire are molded in one operation, whereby the mold cavity in the region of the tread surface is defined by a mold part formed by a plurality of segments. Each of these segments is mounted on a segment carrier and the segment carriers are arranged about the core, whereby each segment carrier is turnable about an axis parallel to the axis of the core and carries at least an additional segment of different configuration for forming the final tread surface region of the tire. The segment carriers are movable in radial direction relative to the core and are in this construction after the first molding step moved radially outwardly and subsequently the carriers are turned about their axes so that another group of segments is directed towards the core, whereafter the segment carriers are moved inwardly in radial direction for forming the tire to its final form. This construction can be used also for molding of large tires, but it has the disadvantage to require a very large space in radial direction, especially during molding of large tires, for the mold carriers which carry two oppositely arranged segments.

SUMMARY OF THE INVENTION

It is an object of the present invention to provide an apparatus for molding tires which overcomes the above-mentioned disadvantages of known apparatus of this kind.

With these and other objects in view, which will become apparent as the description proceeds, the apparatus for molding tires of vehicles, especially motor vehicles, mainly comprises support means, a multi-part mold mounted on the support means and comprising a core shaped in accordance with the inner surface of the tire to be molded and a plurality of mold parts shaped in accordance with the outer surface of the tire and including a pair of mold end parts coaxially arranged with the core and abutting with surface portions thereof respectively against opposite ends of the latter, in which at least one of the end parts is movable in axial direction relative to the core, and a plurality of mold segments about the core shaped to define with the end parts the outer surface of the tire to be molded, a plurality of segment carriers respectively carrying the mold segments, first moving means connected to the segment carriers for moving the same in radial direction relative to the core, and second moving means connected to the segment carriers for tilting the same toward and away from the core.

Due to the combination of the two moving means it is possible to remove also large molded tires from the mold without damaging or deforming the tire while the space requirements in radial direction for this apparatus are relatively small.

In a preferred construction according to the present invention, the radial movement of the segment carriers is obtained by a fluid-operated cylinder-and-piston unit provided on each of the segment carriers.

The invention may be used with an apparatus provided only with one group of segments as well as with an apparatus in which a plurality of segment groups are provided by means of which different regions of the tire are injection molded one after the other. In an especially advantageous construction, the differently formed segments are mounted on each segment carrier movable in axial direction of the core, which construction requires little space in radial direction of the mold.

In an especially simple construction the individual segments mounted on the segment carriers are tiltable by means of arms about tilting axes located below the lower mold end part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a partially sectioned side view of an apparatus according to the present invention with tiltable and radially movable segment carriers each provided with a mold segment having each two adjacent differently shaped segment portions;

FIG. 2 is a cross-section taken along the line II—II of FIG. 1 in which the mold is shown in closed position and turned relative to the position shown in FIG. 1 through 90°;

FIG. 3 is a cross-section through the piston-and-cylinder unit for radial movement of a segment carrier;

FIG. 4 is a vertical cross-section through the detail shown in FIG. 3; and

FIG. 5 is a partly sectioned side view of a modification of the apparatus according to the present invention.

DESCRIPTION OF THE PREFERRED EMBODIMENTS

Referring now to the drawing, and more specifically to FIGS. 1 and 2, it will be seen that the apparatus according to the present invention comprises a mold having a split core 1, an upper mold end part 2, a lower mold end part 3 coaxially arranged with the core 1 and a plurality of mold segments 5 having inner surfaces configurated according to the tread surface of a tire 6 to be formed. In the closed position of the segments, the latter define with the other mold parts the cavity of the mold into which the material from which the tire is to be molded is injected in a known manner through non-illustrated openings.

The central core 1, the upper mold end part 2 and the lower end mold part 3 are coaxially mounted in abutting relationship, as shown in FIG. 1 on the upper end of a column 9, and the aforementioned mold parts are releasably connected in the abutting relationship in a known manner as schematically shown in the drawing in such a way that after the molding of a tire 6 at least the upper mold end part 2 and preferably also the core 1 may be moved in axial direction relative to the lower mold part 3.

The plurality of segments 5, for instance four, are respectively carried by segment carriers 8 movable toward and away from the core 1. For this purpose a pair of guide links 11 and 12 are provided which respectively are pivotally connected at one of the ends thereof to a coupling member 13 connected to the respective segment carrier 8 and at the other ends to members 14 forming extensions of a plurality of arms 10 respectively projecting in radial direction from the lower end of the column 9. Two of the arms 10 are further provided, as shown in FIG. 1, with radially and upwardly extending portions 4, the upper ends of which are provided with trunions 7 respectively mounted in bearings 7' and a motor 7'' is connected to the extension of one of the trunions, as shown at the right side of FIG. 1, for turning the whole support constituted by the column 9, the arms 10 and the extensions 4 about a horizontal axis from the position shown in FIG. 1 to that shown in FIG. 2. Each of the guide linkages 11, 12, 13, 14 is preferably movable by a fluid-operated cylinder-and-piston unit 15 pivotally connected at one end to the linkage 12 and at the other end to the respective arm 10. FIG. 1 shows the cylinder-and-piston units 15 in collapsed position, whereby the segment carriers 8 are tilted away from the mold parts 1, 2 and 3.

In addition, the segment carriers 8 are also radially movable with respect to the core 1. For this purpose a cylinder-and-piston unit 16, 20 is provided for each of the segment carriers 8 in which the piston 16 is fixedly connected to the respective carrier while the cylinder 20 is carried in the manner best shown in FIGS. 3 and 4 by a slide 19 which is movably guided in a direction substantially normal to the respective segment carrier 8 by a rod 17 connected at one end to the respective carrier and slidably arranged in a bore 18 of the slide 19. The slide 19 is in addition adjustably connected to the respective coupling member 13 by a spindle drive 21.

In the modification shown in FIGS. 1 and 2, each segment 5 has two differently shaped segment portions 22 and 23, whereby the segment portion 22 is used to form the body of the tire and the segment portion 23 to form the tread surface thereof. In order to bring the respective segment portion in proper position relative to the core 1, the segments 5 are mounted on the respective segment carrier 8 movable in longitudinal direction of the latter. For this purpose each of the mold segments is guided in a known manner in longitudinal direction on the respective segment carrier 8 and provided with a rack 24 integrally connected to the respective segment and cooperating with a motor driven pinion 25 for moving the segment 5 in longitudinal direction of the segment carrier so as to bring either the segment portion 22 or 23 in cooperating relationship to the core 1.

The above-described apparatus will be operated as follows:

During a first molding step, the segment carriers 8 and the segments 5 carried thereon are tilted by means of the cylinder-and-piston units 15 towards the core 1 and radially moved subsequently with respect thereto by operation of the cylinder-and-piston unit 16, 20, with the segments 5 adjusted in longitudinal direction of the respective carrier 8 so that the segment portion 22 is brought into correlation position with respect to the core 1, whereby in addition a fine adjustment in radial direction is carried out by means of the spindle drive 21. After injection molding of the body of the tire, the segment carriers 8 are moved by the cylinder-and-piston unit 16, 20 in radial outward direction to be subsequently tilted away from the core 1 by operating the cylinder-and-piston units 15. Subsequently thereto, the segments 5 are moved by means of the rack and pinion drive 24, 25 along the respective segment carriers 8 to bring the segment portions in proper position relative to the core 1, whereafter the segment carriers 8 are tilted in the aforementioned manner toward the core 1 and moved radially with respect thereto. Subsequently thereto the tread surface of the tire 6 is injection molded. In order to avoid formation of any shrink holes, the support means 9, 10 and the various elements mounted thereon are tilted during the injection molding by means of the drive 7'' to the position as shown in FIG. 2.

Relatively simple drives are required in this construction in order to move the mold segments in the aforementioned manner so that the whole apparatus may be produced at reasonable cost while requiring, even in the open position, a relatively small space.

Fluid-operated cylinder-and-piston means have been proven especially advantageous for tilting and radial movement of the segment carriers 8, since such cylinder-and-piston units can be operated with relatively simple control means while assuring a sufficient large movability of the mold segments.

By making the segment carriers 8 and the mold segments 5 mounted thereon tiltable and radially movable, the apparatus according to the present invention has all the advantages of known apparatus with tiltable segment carriers, while avoiding the above-mentioned disadvantages of such apparatus, so that with the apparatus according to the present invention the production of tires of greatly different dimensions may be carried out in subsequent injection molding steps, while the space requirements of the apparatus is greatly reduced as compared to such apparatus known in the art.

The embodiment shown in FIG. 5 is used for forming the whole tire in a single injection molding operation, which is for instance possible in molding tractor tires. The apparatus shown in FIG. 5 is, therefore, simpler than the apparatus illustrated in FIGS. 1 and 2. As shown in FIG. 5 the segment carriers 8' which carry the segments 5' are in a manner similar as described before in connection with the apparatus shown in FIGS. 1 and 2, movable by cylinder-and-piston units 20 relative to the slide 19. Each slide 19 is movable by means of a spindle drive 21, as shown in FIG. 3 on an arm 26. Each of the bent arms 26 is tiltably mounted at 27 on the column 9' and its fluid-operated cylinder-and-piston unit 15 is connected at one end to the respective arm 26 and at the other end to a respective arm 10' which projects in radial direction from the lower end of the column 9'. The whole support means for the various mold parts are again tiltable about a horizontal axis in the manner as described before in connection with the embodiments shown in FIGS. 1 and 2.

In the embodiment shown in FIG. 5 the segment carriers 8' are therefore tiltable by means of the cylinder-and-piston units 15 and radially movable by means of the cylinder-and-piston units 16, 20. During injection molding of a tire with the apparatus as shown in FIG. 5 the core 1 and the upper and lower mold end parts 2 and 3 are first mounted on the upper end of the column 9' and clamped together by the means schematically shown in FIG. 5 and subsequently thereto the segment carriers 8' together with the segments 5' are tilted by means of the cylinder-and-piston units 15 toward the other mold element and subsequently radially moved by means of the cylinder-and-piston units 20 relative thereto. After injection molding of the tire 6, the segment carriers 8 with the segments 5' are first moved by means of the cylinder-and-piston unit 20 in radial direction outwardly and subsequently tilted by the cylinder-and-piston units 15 to the position shown in FIG. 5.

It will be understood that each of the elements described above, or two or more together, may also find a useful application in other types of apparatus for molding tires differing from the types described above.

While the invention has been illustrated and described as embodied in apparatus for molding tires in which a plurality of mold segments are arranged about a core of the mold movable in radial direction and tiltable with respect to the core between an open and a closed position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for molding tires of vehicles, especially motor vehicles, a combination comprising support means; a multi-part mold mounted on said support means and comprising a stationary rigid core having an axis and opposite ends and being shaped in accordance with the inner surface of the tire to be molded and a plurality of mold parts shaped in accordance with the outer surface of the tire and including a pair of mold end parts coaxially arranged with said axis of said core and abutting with surface portion thereof respectively against said opposite ends of the latter, at least one of said end parts being movable in axial direction relative to said core, and a plurality of mold segment means about said core shaped to define with said end parts the outer surface of said tire to be molded; a plurality of segment carriers respectively carrying said mold segment means; first moving means connected to said segment carriers for moving the same in radial direction relative to said core; and second moving means connected to said segment carriers for tilting the same toward and away from said core, said first and second moving means operating independent from the movement of said at least one mold end part.

2. A combination as defined in claim 1, wherein said first moving means comprise fluid-operated cylinder-and-piston means for each of said segment carriers.

3. A combination as defined in claim 2, wherein said support means comprise an upright column on which said core and said mold end parts are mounted with one of said end parts forming an upper and the other a lower mold part, and in which said second moving means each comprise an arm operatively connected to the respective segment carrier and to said column tiltable about a pivot axis arranged below said lower mold end part.

4. A combination as defined in claim 3, wherein said support means further comprise a plurality of arms projecting from the lower end of said column to opposite sides of the latter, and wherein said second moving means further comprise fluid-operated cylinder-and-piston means for each segment carrier pivotally connected to a respective arm of said support means and said arm of said second moving means distant from the pivot axis of the latter.

5. A combination as defined in claim 1, wherein each of said mold segment means comprise two adjacent segment portions of different configuration, and including means operatively connected to each of said segment carriers and the mold segment means carried thereon for moving the mold segment means relative to the segment carrier in the longitudinal direction of the latter.

6. A combination as defined in claim 1, wherein said second moving means comprise a multi-arm linkage arranged between said support means and each of said segment carriers and fluid-operated cylinder-and-piston means between said support means and one of the arms of said linkage.

7. A combination as defined in claim 1, wherein said support means comprise an upright column on which said core and said mold end parts are mounted, a pair of arms projecting in the region of the lower end of said column to opposite sides of the latter and having at outer ends upwardly projecting portions and a trunion extending in the horizontal direction outwardly from each of said upwardly extending portions, and including bearing means mounting said trunions turnable about a horizontal axis, and means operatively connected to one of said trunions for turning said support means through 90° about said horizontal axis.

* * * * *